(12) United States Patent
Tasch et al.

(10) Patent No.: US 6,511,225 B2
(45) Date of Patent: Jan. 28, 2003

(54) CALIBRATED SLIDING BEARING BUSHING AND CALIBRATING TOOL FOR PRODUCING THE SLIDING BEARING BUSHING

(75) Inventors: Franz Tasch, Rheinstetten (DE); Stefan Freund, Gaggenau (DE); Hartmut Buschle, Fellbach (DE)

(73) Assignee: Robert Bosch GmbH, Stuttgart (DE)

(*) Notice: Subject to any disclaimer, the term of this patent is extended or adjusted under 35 U.S.C. 154(b) by 16 days.

(21) Appl. No.: 09/863,984

(22) Filed: May 23, 2001

(65) Prior Publication Data

US 2001/0055431 A1 Dec. 27, 2001

(30) Foreign Application Priority Data

May 23, 2000 (DE) ......................................... 100 25 499

(51) Int. Cl.[7] .............................................. F16C 33/06
(52) U.S. Cl. ...................................... 384/279; 384/902
(58) Field of Search ................................ 384/279, 902, 384/276; 29/898.02, 898.057; 419/5

(56) References Cited

U.S. PATENT DOCUMENTS 2,786,726 A * 3/1957 Tarr ........................... 384/902
3,445,148 A * 5/1969 Harris et al. ................ 384/279
4,293,789 A * 10/1981 King ........................... 310/239
6,415,512 B1 * 7/2002 Jeong .......................... 148/906

FOREIGN PATENT DOCUMENTS

| EP | 0 509 683 A2 | 10/1992 |
| JP | 401030923 A | * 2/1989 |
| JP | 5-71539 | * 3/1993 |
| WO | 98/40751 | 9/1998 |

* cited by examiner

Primary Examiner—Thomas R. Hannon
(74) Attorney, Agent, or Firm—Michael J. Striker

(57) ABSTRACT

A sliding bearing bushing has a first end side, a second end side, an inwardly cylindrical second longitudinal portion which is calibrated by a material compression and adjoins the second end side, a substantially hollow conical first longitudinal portion which adjoins the first end side, and a third longitudinal portion which is arranged between the first and second longitudinal portions, the third longitudinal portion transferring bend-free from a contour of the second longitudinal portion into a continuous curvature so that, in a contour of the cylindrical portion straight lines located parallel to a longitudinal axis of the sliding bearing bushing are tangents to a curvature, and at least in a region of the tangents at the curvature the material of the sliding bearing bushing is compressed by calibration substantially identically strong as in the cylindrical longitudinal portion.

4 Claims, 1 Drawing Sheet

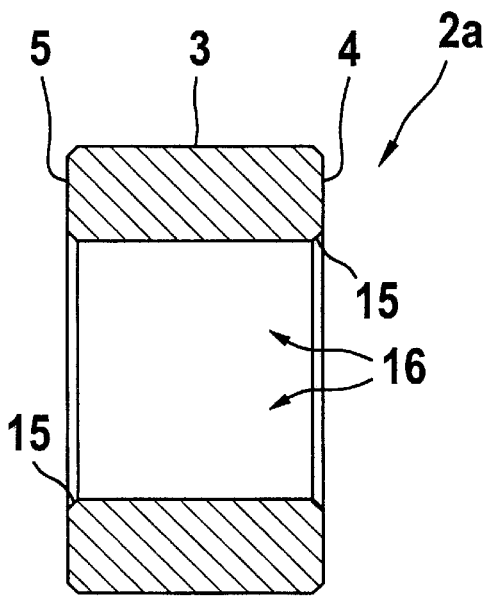
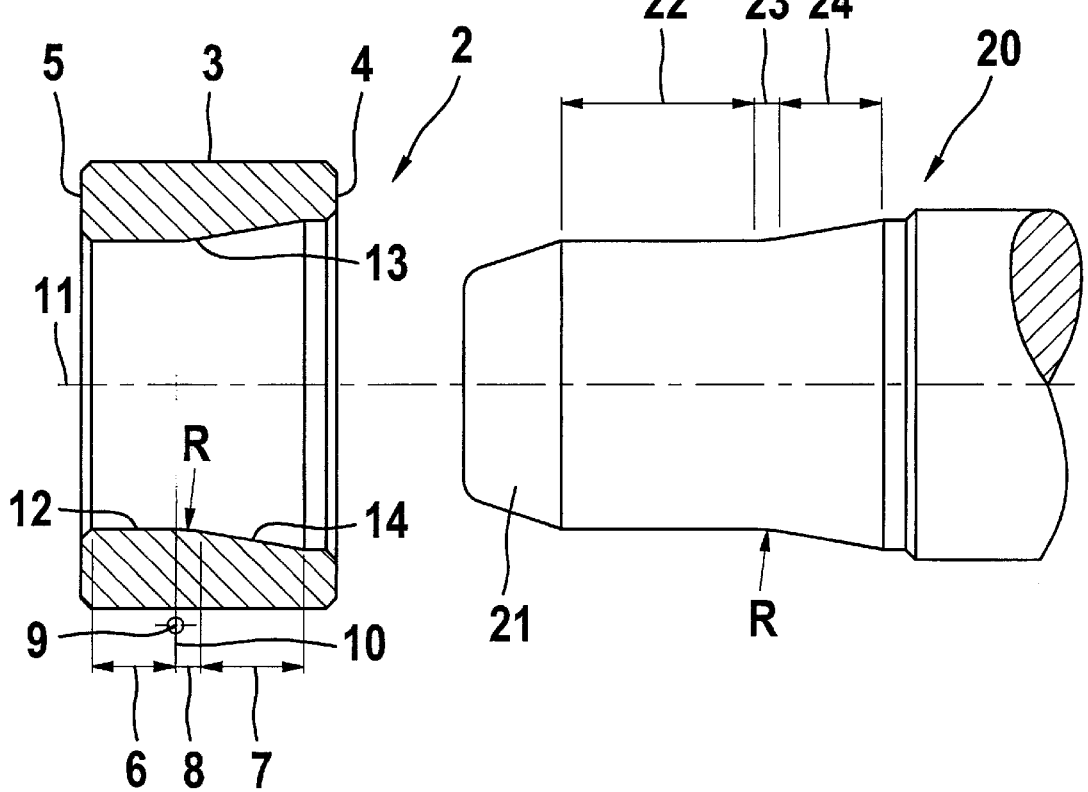

CALIBRATED SLIDING BEARING BUSHING AND CALIBRATING TOOL FOR PRODUCING THE SLIDING BEARING BUSHING

BACKGROUND OF THE INVENTION

The present invention relates to a calibrated sliding bearing bushing and a calibrating tool for producing the sliding bearing bushing.

The patent document WO 98/40751 discloses a small electric small motor which has an armature, a shaft supports the armature, and a first and a second sliding bearing bushing which rotatably support the shaft. The first sliding bearing bushing which is arranged to take a greater bearing load is outwardly formed as a calotte and arranged pivotably in the small motor to compensate for a canted orientation of the shaft relative to a construction axis of the small electric motor by self orientation of the first sliding bearing bushing. It is known that with this compensation a favorable load distribution within the sliding bearing bushing is provided. The second sliding bearing bushing is formed cylindrically on the outside and rigidly mounted in the small motor. The second bearing bushing is inwardly, over a part of its length, cylindrical for supporting the shaft. As seen from the first sliding bearing bushing, it is formed on another part of its length as a hollow cone, so that an inlet funnel is provided for easy insertion of the shaft during the assembly of the small electric motor. Because of the rigid connection of the second sliding bearing bushing, it is not possible to provide the self orientation corresponding to the self orientation of the first sliding bearing bushing. At the same time, a disadvantageously high surface pressure is provided in the cylindrical sliding bearing bushing depending on the accidental canted orientation of the shaft relative to the cylindrical sliding bearing bushing surface. It can result in wear of the sliding bearing material or the shaft material. This can lead to a non-quite running of the shaft and to dirtying a bearing gap which is unavoidably formed between the sliding bearing bushing and the shaft, and can ultimatelylead to bearing damages.

U.S. Pat. No. 4,293,789 discloses a small electric motor with an outer cylindrical sliding bearing bushing, which is formed as a hollow cone at both end sides and has between them a narrow longitudinal portion with a hollow cylindrical shape to provide a sliding bearing surface. FIG. 2 of this patent illustrates ring edges which limit the inner cylindrical longitudinal portion from both hollow-conical longitudinal portions. An unavoidable canted position of the armature shaft relative to the sliding bearing bushing can lead to the above mentioned disadvantage.

Also, experts in the art are familiar with sintered sliding bearing bushings which are impregnated with lubricant for calibration of the diameter of the sliding bearing surfaces by pressing of balls or calibrating mandrels with cylindrical cross-sections, to produce ring edges. The calibrating mandrels or balls compact the sintered sliding bearing material. Ring edges are produced, as shown for example in FIG. 2 of this patent.

European patent document EP 0 509 683 82 and in particular in FIG. 6 discloses a small electric motor with an outer cylindrical sliding bearing bushing, which has an inner curved surface as a bearing bushing surface, so that the sliding bearing bushing can be produced from a torus with a circular cross section by removing of a material of an outer periphery and in the end side regions. Because of the curved sliding bearing surface, no ring edges are available in the immediate vicinity to a shaft to be supported and no edge pressure of the above described type is possible. A disadvantage of this solution is that, due to the curvature of the sliding bearing surface, a sliding surface pressure is basically greater than that during the use of a canting-movable bearing bushings with cylindrical sliding bearing surfaces.

SUMMARY OF THE INVENTION

Accordingly, it is an object of the present invention to provide a sliding bearing bushing and a method of producing the same which eliminates the disadvantages of the prior art.

In keeping with these objects and with others which will become apparent hereinafter, one feature of the present invention resides, briefly stated, in a sintered and calibrated bearing bushing which has a first end side; a second end side; an inwardly cylindrical second longitudinal portion which is calibrated by a material compression and adjoins said second end side; a substantially hollow conical first longitudinal portion which adjoins said first end side; and a third longitudinal portion which is arranged between said first and second longitudinal portions, said third longitudinal portion transferring bend-free from a contour of said second longitudinal portion into a continuous curvature so that, in a contour of said cylindrical portion straight lines located parallel to a longitudinal axis of the sliding bearing bushing are tangents to a curvature, and at least in a region of the tangents at the curvature the material of the sliding bearing bushing is compressed by calibration substantially identically strong as in said cylindrical longitudinal portion.

When the sliding bearing bushing is designed in accordance with the present invention, it has the advantage that on the one hand when practically no canted position of the shaft for the sliding bearing bushing is available it has a favorable distribution of pressures, and on the other hand when not too great canting position of the shaft relative to the sliding bearing bushing is provided it has an operational property comparable with the operational property of the sliding bearing bushing disclosed in the European patent document EP 0 509 683. It can be indicated that the inventive sliding bearing bushing combines the advantageous properties of an inwardly cylindrical sliding bearing bushing with the advantages of a sliding bearing bushing provided with a continuously curved sliding bearing surface, and a corresponding orientation of the shaft relative to the sliding bearing bushing determines which of the both positive properties is used.

In accordance with another feature of present invention a sintered blank from which the sliding bearing bushing is formed by calibration, is formed substantially over its whole length substantially cylindrically inside. When the sliding bearing bushing is designed in accordance with this feature, then it has the advantage that the sintered sliding bearing material in the region of the continuous curvature and adjoining to the inner cylindrical longitudinal portion has a material compression which is at least as high as the material compression in the region of the cylindrical longitudinal portion and therefore an advantageous resistance to wear is provided in the region of the continuous curvature.

In accordance with the present invention also a calibrating mandrel is provided which has a cylindrical longitudinal portion; a continuously curved transition which is bend-free adjoins said cylindrical longitudinal portion and has a greater diameter than said cylindrical longitudinal portion, so that for a bend-free construction a projection of said cylindrical longitudinal portion in a projection direction encloses tangents to said continuously curved transition.

The calibration mandrel is designed for an edgeless transition from the cylindrical longitudinal portion to the longitudinal portion with the curved transition. This calibrating mandrel can be produced for example mathematically accurately with the use of a grinding roller oriented substantially transversely to the calibrating mandrel. It produces the diameter of the cylindrical longitudinal portion and determines the half diameter of the continuous curvature of the transition.

In accordance with a further feature of the present invention the calibrating mandrel has a substantially conical longitudinal portion having an increasing diameter and adjoining said continuously curved longitudinal portion. Such a calibrating mandrel has an advantage that a hollow-conical inlet funnel of the sliding bearing bushing is also compressed and smooth, and counteracts an undesirable escape of lubricant from a surface of the sliding bearing bushing which is not in contact with the shaft.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows an inventive sliding bearing bushing in a finished condition and in a longitudinal section;

FIG. 2 is a view a blank of the inventive sliding bearing bushing, also in a longitudinal section; and FIG. 3 is a side view of the inventive calibrating mandrel.

DESCRIPTION OF THE PREFERRED EMBODIMENTS

A sintered and calibrated sliding bearing bushing is identified with reference numeral 2 and shown in FIG. 1. It is composed for example of a material selected for such bearing bushing in the prior art. It has outwardly a cylindrical limiting surface 3, a first end side 4, a second end side 5, a certain longitudinal portion 6 at the second end side 5, and a substantially hollow-conical longitudinal portion 7 at the first end side 4, and also a third longitudinal portion 8 therebetween.

In contrast to the first, hollow cylindrical longitudinal portion 7, the second longitudinal portion 6 is calibrated inwardly cylindrically. The third longitudinal portion is a continuously curved portion, which is also calibrated and, since it adjoins the second longitudinal portion 6, is substantially equally strongly compressed as the second longitudinal portion 6. In a technically simple manner the continuous curvature can be realized with a radius R which has an initial point 9 corresponding to a central curvature point of the curvature. From mathematical consideration, the initial point 9 is located on such a dimensional line 10 which provides a border between the second longitudinal portion 6 and the third longitudinal portion 8. Since the sliding bearing portion 2 is a rotation-symmetrical body, the dimensional line 10 extends transversely to a longitudinal axis 11 of the sliding bearing bushing In accordance with the invention, the initial point 9 of the radius relative to the longitudinal axis 11 of the sliding bearing bush 2 is located so that, an inwardly cylindrical sliding bearing surface 12 of the second longitudinal portion 6 and its projection against the first end side 4 form an endless number of tangents for a curved surface 13, whose rotation-symmetrical contour is produced by the radius R. The mathematical expression "tangent" means also that a rotation-symmetrical transition from the cylindrical sliding bearing surface 12 to the curved surface 13 is designed without a bend and therefore without an edge.

A substantially conical surface 14 follows the curved surface 13 of the third longitudinal portion 8 inside the first longitudinal portion 7, for example for a hollow-conical shape. A conical surface 14 substantially forms an inlet funnel for a latter assembly, for example a small electrical motor with a shaft which is supported by the inventive sliding bearing bushing 2. In contrast to the bend-free transition of the cylindrical sliding bearing surface 12 to the curved surface 13, a transition from the curved surface 13 to the substantially conical surface 14 does not have to be bend-free. The provision of a bend at the above mentioned border between the first longitudinal portion 7 and third longitudinal portion 8 can facilitate the production of the sliding bearing bushing 2 and in particular its calibration.

Alternatingly, there is a possibility to produce the substantially conical surface 14 also by a calibrating process. In such a case it is possible to use a blank 2a which is shown in FIG. 2 and has a first end side 4 and a second end side 5, and a cylindrical peripheral surface 3, so that it is formed inwardly substantially over its entire length cylindrically. Conventional chamfers 15 are provided at the transition from the end sides 4 and 5 to the inner opening 16. The opening 16 of the blank 2a naturally is formed smaller from experience, or a smaller diameter than the cylindrical sliding bearing surface 12 in the final condition can be selected by research.

A calibrating mandrel is identified with reference numeral 20 and shown in FIG. 3. It has a truncated cone 21 and a longitudinal portion which adjoins it and is formed cylindrically with a diameter, such that by pressing of the calibrating mandrel 20 into a blank 2a a material compression is provided, so that after the withdrawal of the calibrating mandrel 20 from the sliding bearing bushing 2 of FIG. 1, the cylindrical sliding bearing surface 12 is produced with a structurally curved final diameter. The longitudinal portion 22 of the calibrating mandrel is naturally formed longer than the second longitudinal portion 6 of the sliding bearing bushing 2. This has the advantage that in a known manner a desired smoothing process is performed and the calibrating mandrel is not replaced prematurely by a new calibrating mandrel.

For production and calibration of the third longitudinal portion 8 of the sliding bearing bushing, a longitudinal portion 23 is provided on the calibrating mandrel 20. It is bend-free and adjoins the cylindrical longitudinal portion 2 without an edge. In a technically simple manner such bend-free transition can be produced when for its manufacture a grinding block is used with a diameter which is substantially the double of the selected radius R. Also a relative rotary speed and therefore a feed movement is produced and utilized, which extends parallel to the longitudinal axis of the calibrating mandrel 20 and begins at the truncated cone 21, wherein a rotary axis in the grinding block intersects the calibrating mandrel 20.

Finally, only one further longitudinal portion 24 must be provided, which is substantially conical and as mentioned, is not necessarily bent-free or edge-less to adjoin the contour of the longitudinal portion 23. This is because in a logical way the selection of the length of the third longitudinal portion 8 of the bearing bushing 2 in connection with the selection of the size of the radius R is performed so that, with a greatest canting position to be expected a shaft inside the sliding bearing bushing 2 has a contact between the shaft and the sliding bearing bushing 2 in the continuously curved region, or in other words the border of the curved surface 13.

A radius R can be selected for favorable manufacture, since as described, the radius R in a technically simple manner can be produced by turning a circular tool, namely a grinding block. When from manufacturing reasons a rotary axis of the grinding block intersects the longitudinal axis of the calibrating mandrel not exactly perpendicularly, then by corresponding canting positions of the rotary axis of the grinding block to the longitudinal axis of the calibrating mandrel 20, a principle of a continuous transition can be provided so that, as seen in the longitudinal section of the calibrating mandrel 2, a design deviation in direction of an elliptic arch can be contained. A sliding bearing bush calibrated by such a calibrating mandrel also has a continuously curved longitudinal portion, relative to which the lines along the cylindrical limiting longitudinal portion can be recommended as tangents.

Finally it should be mentioned that a permissible canting position of a shaft inside an inventive sliding bearing bushing 2 is naturally limited by a radial gap provided by the construction, and by the selected length of the second longitudinal portion 6.

It will be understood that each of the elements described above, or two or more together, may also find a useful application in other types of constructions differing from the types described above.

While the invention has been illustrated and described as embodied in calibrated sliding bearing bushing and calibrating tool for producing the sliding bearing bushing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters Patent is set forth in the appended claims:

What is claimed is:

1. A sintered and calibrated sliding bearing bushing, comprising a first end side; a second end side; an inwardly cylindrical second longitudinal portion which is calibrated by a material compression and adjoins said second end side; a substantially hollow conical first longitudinal portion which adjoins said first end side; and a third longitudinal portion which is arranged between said first and second longitudinal portions, said third longitudinal portion transferring bend-free from a contour of said second longitudinal portion into a continuous curvature so that, in a contour of said cylindrical portion straight lines located parallel to a longitudinal axis of the sliding bearing bushing are tangents to a curvature, and at least in a region of the tangents at the curvature the material of the sliding bearing bushing is compressed by calibration substantially identically strong as in said cylindrical longitudinal portion.

2. A sintered and calibrated sliding bearing bushing as defined in claim 1, wherein a sintered blank from which the sliding bearing bushing is formed by calibration, is formed substantially over its whole length substantially cylindrically inside.

3. A calibrating mandrel for producing a sintered and calibrated sliding bearing bushing, comprising a cylindrical longitudinal portion; a continuously curved transition which is bend-free adjoins said cylindrical longitudinal portion and has a greater diameter than said cylindrical longitudinal portion, so that for a bend-free construction a projection of said cylindrical longitudinal portion in a projection direction encloses tangents to said continuously curved transition.

4. A calibrating mandrel as defined in claim 3; and further comprising a substantially conical longitudinal portion having an increasing diameter and adjoining said continuously curved longitudinal portion.

\* \* \* \* \*